June 19, 1945.  R. POPP  2,378,655
SWITCH MECHANISM
Filed April 6, 1942
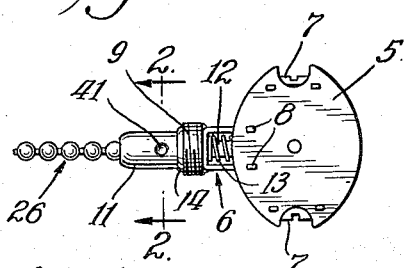
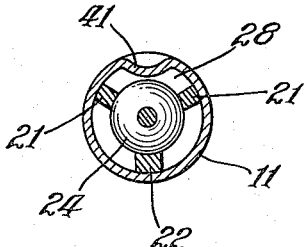
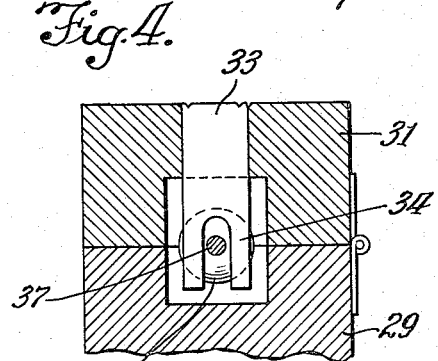
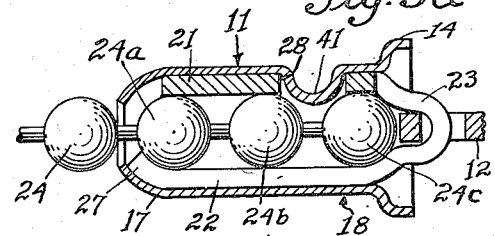
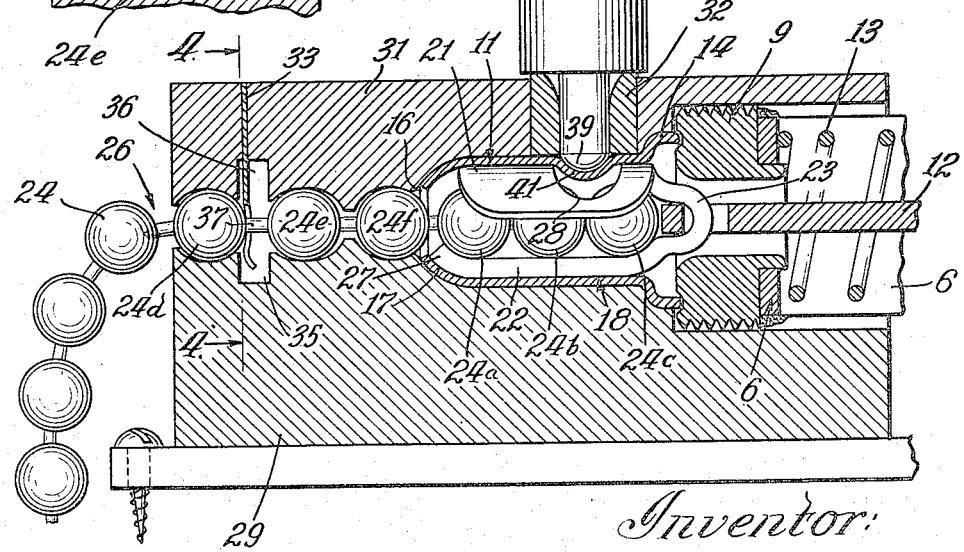
Inventor:
Rudolf Popp
By: Foorman L. Mueller
Atty.

Patented June 19, 1945

2,378,655

UNITED STATES PATENT OFFICE 2,378,655

SWITCH MECHANISM

Rudolf Popp, Valparaiso, Ind., assignor to McGill Manufacturing Company, Valparaiso, Ind., a corporation of Indiana Application April 6, 1942, Serial No. 437,784

1 Claim. (Cl. 74—501)

This invention relates generally to switch mechanisms and in particular to a switch mechanism having an operating lever in a universal connection therewith.

It is an object of this invention to provide an improved universal connection.

Another object is to provide a universal connection which is comprised of but few parts having relatively wide machining tolerances and adapted to be positively assembled together with a minimum number of assembly operations.

A feature of this invention is found in the provision of a universal connection in which a tubular lever and connector for attaching the lever to a switch mechanism are positively and simply secured together by pressing a portion of the lever through a corresponding cavity in the connector after the connector has been inserted therein.

Further objects, features, and advantages of this invention will become apparent from the following description when taken in connection with the accompanying drawing in which:

Fig. 1 is a plan view of a complete switch mechanism embodying the universal connection of this invention;

Fig. 2 is a transverse sectional view of the universal connection as seen along the line 2—2 in Fig. 1;

Fig. 3 is an enlarged sectional view of the universal connection illustrated in conjunction with an assembly jig therefor, the connector and tubular lever being shown in their relative assembly positions;

Fig. 3A is an enlarged side sectional view of the lever, chain and connector mechanism illustrating the relative positions of these elements when completely assembled; and Fig. 4 is a fragmentary sectional view taken along the line 4—4 in Fig. 3 showing a portion of the jig structure for relatively positioning the connector and lever members.

Referring to the drawing there is shown in Fig. 1 a switch mechanism mounted between a pair of insulating plates 5 which are spaced apart by posts 7 extended through the plates and upset at their projecting ends to clamp the plates and hold them in position. A substantially U-shaped mounting member 6 is supported between the plates 5 and has projections 8 extended through the plates to retain such member in position therewith. The mounting member 6 is integrally formed with a collar portion 9 which provides a fulcrum for a tubular lever 11 (Figs. 1 and 3). The collar portion has an aperture therein for receiving a reciprocating actuator member or stem 12 operatively associated with the contact elements (not shown) of the switch mechanism. The stem 12 is moved toward the right as viewed in Figs. 1 and 3 by the action of a spring 13, its movements toward the left being manually accomplished by the operation of the lever 11.

The tubular lever 11 has a wall portion of substantially uniform thickness and is composed of a material providing for its machining by a drawing operation. The lever end 14 is formed with an annular axially extending flange adapted to be received in an annular groove in the collar portion 9 (Figs. 3 and 3A). The opposite end 16 of the lever is open but is curved inwardly to form a shoulder portion 17 within the lever for a purpose to be later noted. A substantially U-shaped connector member 18 is pivotally connected at one end to the actuating member 12 and is secured within the lever 11. The connector comprises a pair of legs 21 and 22 connected together by a loop 23 which extends through an aperture in the member 12 to pivotally connect the actuating member and the connector. The leg 21 is of a contour corresponding to the curvature of the tubular lever 11 and to balls or beads 24 of a beaded chain 26 (Fig. 2).

In assembling this portion of the switch mechanism the leg 22 is inserted through the aperture in the actuator member 12 and about three of the beads at the end of the chain 26 indicated as 24a—24c are inserted and retained between the legs 21 and 22. The free end 27 of the leg 22 is curved inwardly toward the leg 21 to hold the balls 24a—24c within the connector, the curvature at the leg end 27 corresponding to the curved shoulder 17 on the lever 11. The chain 26 is inserted through the lever 11 at its end 14 and the lever is passed over the chain until the connector 18 is positioned within the lever with the end 27 thereof in mating engagement against the shoulder 17. This engagement occurs concurrently with the location of the lever end 14 within the groove on the collar portion 9.

In some of the prior art switch mechanisms the connector and lever are secured together by providing aligned holes in the lever and the connector. The hole in the lever is threaded and a screw is tightened therein and projected within the hole in the connector. This construction is relaively expensive because of the difficulties encountered in tapping a relatively small hole formed in the curved wall portion of the lever, and in the close machining tolerances required in making the connector and lever to assure the proper alignment of the holes therein. As a result many levers are scrapped and much time is lost in the assembly operation due to the cut and try selection of a lever and connector in which the holes are in alignment. The manufacturing cost of these prior art universal connections is further increased by the additional assembly operation required for threading a screw in the lever. Switch mechanisms utilizing universal levers are produced in large quantities so that any small unit saving soon amounts to sizeable proportions.

In the present invention the connector leg 21 is provided with an aperture or hole 28. When the connector 18 and lever 11 are assembled together, as above described, they are placed within a jig structure having a lower half 29 and a mating top portion 31 hinged together for opening. In other words each half portion of the jig has a contour that fits the shape of the lever and mechanism to half the thickness of the lever. In positioning this assembly of the lever and connector in the jig portion 29 it is essential that the opening 28 in the connector 18 is at the top of the lever 11 so as to be located opposite a hardened bushing 32 in the jig portion 31 when such portion is in mating engagement with the jig portion 29. From a consideration of Figs. 1 and 3 it is seen that the plane of the loop 23 is normal to the plane of the actuating member 12, which in turn is normal to the parallel planes of the leg members in the mounting member 6. The contours of the jig portions 29 and 31 are thus adapted to receive the switch mechanism with the legs of the mounting portion 6 in a vertical plane, which in turn locates the plane of the loop 23 in a vertical direction. The location of the connector opening 28 at the top of the lever 11 is thus positively determined.

In order to position the lever 11 and connector 18 for relative assembly the jig portion 31 is provided with a spring arm 33 secured at one end within the portion 31 and having spaced fingers 34 at the free end thereof for straddling a link 37 connecting together adjacent balls of the chain 26 (Figs. 3 and 4). The fingers 34 extend within oppositely arranged cavities 35 and 36 formed in the jig portions 29 and 31, respectively. With the switch mechanism positioned within the jig portion 29, on closing of the portion 31 therewith a ball indicated at 24d located outwardly from the lever 11 is in a position to be engaged by the fingers 34 which straddle the ball link 37. The action of the spring arm 33 on the ball 24d extends the balls 24e and 24f arranged between the ball 24d and the lever 11 to likewise pull on the balls 24a—24c. These in turn pull the connector 18 in which they are secured and retain the curved end 27 of the connector 18 against the shoulder portion 17 of the lever 11. As is clearly shown in Fig. 3 the contoured surfaces of the jig portions 29 and 31 locate the approximate positions of the balls 24d—24f and permit movement of such balls in response to the action of the spring arm 33.

With the parts of the switch mechanism thus retained in their proper relative positions by the spring arm 33 there is inserted in the bushing 32 a punch 38 having a rounded end 39 for engaging the lever 11 opposite the hole 28 in the connector 18. By striking on the punch 38 the lever 11 is depressed or extended at the bushing 32 to form a lug portion 41 which projects within the connector opening 28. By virtue of the rounded contour of the end 39 of the punch 38 it is readily apparent that any slight misalignment between the bushing 32 and the opening 28 is compensated for during the punching operation to locate the lug 41 within the opening.

The three balls 24a—24c are received within the connector 18 so that the opening 28 in the connector leg 21 is positioned intermediate the two adjacent balls 24b and 24c. The lug 41, therefore, is extended within the space between the two balls 24b and 24c without interference from such balls in the manner best illustrated in Fig. 3A of the drawing. Thus, the lug 41 may be engaged by the ball 24c to prevent substantial relative movement between the chain and the connector should the interlock between the curved end 27 of the connector and the ball 24a of the chain become insecure. It is to be understood of course that the lever 11 may be completely pierced by the punch 38 instead of merely dented thereby to secure the connector and the lever 11. With the connector and lever 11 thus secured the switch mechanism is removed from between the jig portions 29 and 31, the relative assembly being maintained by virtue of the engagement of the lug 41 with the connector leg 21. It is seen, therefore, that securing screws between the connector 18 and lever 11 are entirely eliminated with their assembly being quickly and positively accomplished by a simple punching operation.

From a consideration of the above description and drawing, therefore, it is seen that the invention provides a universal connection in which the component parts may be machined by simple forming operations eliminating all precision work and permitting relatively wide permissible tolerances without in any manner impairing their proper assembly. Labor costs in the machining as well as in the assembly of these parts are thus reduced to a minimum to provide a universal connection of rugged construction adapted to be economically produced in large quantities.

Although the invention has been specifically described with respect to a preferred embodiment thereof it is to be understood that modifications and alterations can be made therein which are within the full intended scope of this invention as defined in the appended claim.

I claim:

An operating device for a switch mechanism comprising a metallic tubular lever having an inwardly extending curved portion at one end thereof, a pull chain extending through said one end of said lever and including at least two connected balls disposed within said lever, a connector disposed within said lever to embrace said two balls and having a part at one end thereof interlocked with said chain adjacent said curved end portion of said lever to hold said chain and lever against relative movement, means provided at the opposite end of said connector for connecting said connector in said switch mechanism, said connector having an aperture therethrough overlying the space between said two balls, and said lever having an integral portion extending through said aperture into the space between said two balls to hold said connector and lever in fixed relative positions and to prevent substantial relative movement between said chain and said connector in the event the interlock therebetween fails.

RUDOLF POPP.